(12) United States Patent
Hirao et al.

(10) Patent No.: US 7,006,425 B1
(45) Date of Patent: Feb. 28, 2006

(54) INFORMATION RECORDING AND/OR REPRODUCING METHOD AND APPARATUS FOR THREE DIMENSIONAL OPTICAL RECORDING MEDIUM

(75) Inventors: Akiko Hirao, Chiba (JP); Hideyuki Nishizawa, Tokyo-To (JP); Takayuki Tsukamoto, Tachikawa (JP); Yoshinori Honguh, Yokohama (JP); Kazuki Matsumoto, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/450,743

(22) Filed: Nov. 30, 1999

(30) Foreign Application Priority Data

Nov. 30, 1998 (JP) .................................... 1998-339602

(51) Int. Cl.
*G11B 7/00* (2006.01)

(52) U.S. Cl. ..................................... 369/111; 369/44.39
(58) Field of Classification Search .................. 369/111, 369/44.39, 103
See application file for complete search history.

(56) References Cited

U.S. PATENT DOCUMENTS

| | | | | |
|---|---|---|---|---|
| 5,109,374 A | * | 4/1992 | Tsunoda et al. | ............. 369/100 |
| 5,218,594 A | * | 6/1993 | Tanno | ......................... 369/100 |
| 5,530,819 A | * | 6/1996 | Day, III et al. | .............. 395/404 |
| 5,844,700 A | * | 12/1998 | Jeganathan et al. | ............. 359/7 |
| 5,923,465 A | * | 7/1999 | Byrd | ........................... 359/368 |
| 5,978,328 A | * | 11/1999 | Tanaka | ..................... 369/44.27 |
| 6,071,671 A | * | 6/2000 | Glushko et al. | ........ 430/270.15 |
| 6,101,156 A | * | 8/2000 | Tanaka et al. | ............. 369/44.28 |
| 6,101,161 A | * | 8/2000 | Yang | .......................... 369/103 |
| 6,104,019 A | * | 8/2000 | Yokota | ...................... 250/201.5 |
| 6,115,151 A | * | 9/2000 | Popovich | ......................... 359/9 |
| 6,295,262 B1 | * | 9/2001 | Kusumoto et al. | ........ 369/53.37 |
| 6,330,118 B1 | * | 12/2001 | Daschner et al. | ............ 359/721 |
| 6,404,708 B1 | * | 6/2002 | Lee | ........................... 369/36.01 |

FOREIGN PATENT DOCUMENTS

| | | |
|---|---|---|
| JP | 04-229417 | 8/1992 |
| JP | 05-135380 | 6/1993 |
| JP | HEI 6-28672 | 2/1994 |
| JP | HEI 6-118306 | 4/1994 |
| JP | 09-139415 | 5/1997 |

OTHER PUBLICATIONS

Kawata et al.; "Three–dimentional optical memory with a photorefractive crystal"; May 12, 1994; Optical Sociaty of America; pp. 4105–4110.*

* cited by examiner

*Primary Examiner*—Gautam R. Patel
(74) *Attorney, Agent, or Firm*—Oblon, Spivak, McClelland, Maier & Neustadt, P.C.

(57) ABSTRACT

Information is recorded/reproduced by focusing a light beam in/from an optical recording medium capable of forming therein marks for information recording in a plurality of three-dimensional directions including an arbitrary directions and at least depth direction. Specifically, the optical beam is sequentially focused at a recorded mark position adjacent an optically recorded mark position, at which a recording/reproducing operation is started, in any directions regardless of the directionality of the plurality of three-dimensional directions, to cause the focused position of the light beam to describe a predetermined locus having a predetermined rule to rapidly and continuously record/reproduce the information. Thus, it is possible to efficiently and rapidly record and reproduce information in an optical recording medium capable of recording high-density information in three-dimensional directions, and it is possible to rapidly and efficiently record and reproduce information using such an optical recording medium.

29 Claims, 9 Drawing Sheets

FIG. 6A (PLANE VIEW OF RECORDING MEDIUM)

INFORMATION RECORDING AND/OR REPRODUCING METHOD AND APPARATUS FOR THREE DIMENSIONAL OPTICAL RECORDING MEDIUM

BACKGROUND OF THE INVENTION

The present invention relates generally to a method for recording and/or reproducing information into an optical recording medium capable of recording information in three-dimensional directions. More specifically, the invention relates to an information recording and/or reproducing method for continuously recording or reproducing marks or pits having recorded information, in accordance with a predetermined rule when the information is recorded or reproduced, an information recording apparatus using the optical recording medium, an information reproducing apparatus for reproducing the recorded information, and an optical recording medium used for recording and/or reproducing information.

As a typical medium capable of recording a large capacity of data, such as a high-density image, there is an optical recording disk. Although magneto-optical recording media and optical phase change media have been developed as optical recording disks, the need for increasing the capacity of information capable of being recorded into an optical recording disk is increasing.

In order to increase the capacity of the optical recording disk, a three-dimensional optical recording medium has been proposed. In this medium, the recording of information into an optical recording disk is allowed in, e.g., a depth direction as well as directions on a plane of the optical recording disk. In other words, a recording plane is multi-layered to three-dimensionally record information. While the optical recording disk has been given as an example of the three-dimensional optical recording medium, it should not be limited to a disk-shaped recording medium, but the three-dimensional optical recording medium may be a card-shaped recording medium or a stick-shaped recording medium as long as it records information in both of planar and depth directions.

The light transmittance of the above described magneto-optical recording medium and optical phase change medium have too low to realize a multilayer structure of tens to hundreds layers. However, there is some possibility that an optical recording medium using a photorefractive material, which will be described later, may realize a three-dimensional optical recording disk of tens to hundreds layers.

The first report on a three-dimensional optical recording medium is made by J. H. Strickler, et al., optical Letters, 16(22), 1789 (1991). This report discloses a three-dimensional mark type optical memory using an inorganic photorefractive material. The photorefractive material means a material having a refractive index changed by an electric field originated in a spatial distribution of electric charges which are generated by irradiating the electromagnetic waves. If such a material is applied to an optical memory, the intensity pattern of electromagnetic waves is recorded in the medium as the modulation in refractive index. The above-described first report discloses that an optical memory is irradiated with two beams to three-dimensionally write marks therein due to the photorefractive effect. With respect to a reproducing operation at this time, it has been reported that information was reproduced every one layer using a phase contrast microscope.

As the second report, Y. Kawata et al., Appl. Opt., 34, 4105 (1995) discloses that an optical memory is irradiated with one beam to three-dimensionally written marks therein due to the photorefractive effect. In the second report, a phase contrast microscope is also used for a reproducing operation.

As disclosed in the two reports, although a method using a phase contrast microscope for reproducing recorded information is suitable for a recording medium having a small cross section area, such as an inorganic crystal, it is not suitable for an optical recording medium having a large cross section area. That is, if this reading method is applied to a large-area disk-shaped optical recording medium, the area readable by a single shot is small, and a batch processing should be repeated. Therefore, there is a disadvantage in that a plurality of light irradiation operations for a reproducing operation must be carried out on the same plane, so that the readout rate is invariably slow.

A case where a recording and/or reproducing method, which has been carried out for a conventional optical recording disk, such as a compact disk, is applied to a three-dimensional optical recording disk will be considered. On the conventional optical recording disk, recording or reproducing light beams are spirally scanned in directions on the plane of the disk to record or reproduce information. That is, the optical recording disk is irradiated with the recording or reproducing light beams by moving a light source or the optical recording disk in radial directions while rotating the optical recording disk.

When this method is applied to the three-dimensional optical recording disk, the spiral recording or reproducing operation in the directions on the plane of the optical recording disk is carried out for one layer, and the recording or reproducing operation for one layer is repeated for a multi-layers, so that the three-dimensional recording operation can be carried out. However, in the method for causing the recording and reproducing operations for each layer to be repeated over the multi-layers, information is reproduced from all of the layers of the disk, so that the readout rate is slow. Because, after the reproducing operation for the first layer, it takes a long period to start the reproducing operation for the next layer.

That is, in order to start the reproducing operation for the second layer after the reproducing operation for the first layer is completed, a process for detecting the position of the mark in the second layer of the optical recording disk in the depth direction is required. Specifically, the position for focused beams in the disk is changed by vertically scanning a lens for condensing readout laser or vertically moving the disk, and simultaneously, the intensity of the reproducing laser is measured to detect a mark, at which the modulation in intensity is largest or a point, at which the modulation in differential of the intensity of the reproducing light is largest. It is considered that the reason why it takes a lot of time for a reproducing operation is that the conventional reproducing method requires a process for detecting a focal point in the depth direction.

Thus, in this technical field, it is desired to develop a three-dimensional optical recording medium capable of three-dimensionally recording information for high-capacity recording into the optical recording disk, and an information recording and/or reproducing method, an information recording apparatus and an information reproducing apparatus, which can rapidly carry out recording and reproducing rates using the optical recording medium. However, this has not been realized. If such an information recording and/or reproducing method is not provided, even if it is possible to record high-capacity information in the three-dimensional optical recording medium in any ways, it is not possible to carry out a rapid recording or reproducing rate which is fit for practical use. In addition, even if a high functional recording medium is developed, it can not been effectively utilized.

SUMMARY OF THE INVENTION

It is therefore an object of the present invention to eliminate the aforementioned problems and to provide an information recording and/or reproducing method capable of efficiently and rapidly recording and reproducing information in an optical recording medium, in which high-capacity information is recorded in three-dimensional directions, and information recording and reproducing apparatuses capable of rapidly and efficiently recording and reproducing information using the optical recording medium.

In order to accomplish the aforementioned and other objects, according to a first aspect of the present invention, there is provided an information recording method for recording information by irradiating a recording light beam in an optical recording medium capable of forming marks for information recording in a plurality of three-dimensional directions so as to record the information as the marks at a predetermined position including a beam-waist and its circumference of the recording light beam, the method comprising: recording a mark by moving a beam-waist of the light beam to an adjacent position to an optically recorded mark which has been previously recorded; and causing marks bit by bit to describe a predetermined locus having a predetermined rule, thereby to rapidly and continuously record the information.

In order to accomplish the aforementioned and other objects, according to a second aspect of the present invention, there is provided an information reproducing method for reproducing information by irradiating nearby a beam-waist of a light beam to marks in an optical recording medium capable of recording the information formed by the marks in a plurality of three-dimensional directions, the method comprising: reproducing the information from the marks by moving the beam-waist of the light beam to a recorded mark which has been already forming a recorded mark by moving a beam-waist of the light beam to an adjacent position of a recorded mark which has been already formed by moving a beam-waist of the light beam to an adjacent position to an optically recorded mark which has been previously recorded; and reproducing the information recorded on the optical recording medium as the marks bit by bit tracing a predetermined locus having a predetermined rule.

In order to accomplish the aforementioned and other objects, according to a third aspect of the present invention, there is provided an information recording apparatus for recording information by irradiating a light beam in an optical recording medium capable of forming marks for information recording in a plurality of three-dimensional directions so as to record the information as the marks near a beam-waist of the light beam, the apparatus comprising: a light beam condensing part for forming a mark by moving a beam-waist of the light beam to an adjacent position to a mark which has been previously recorded; and a moving mechanism for causing the beam-waist to be moved step by step to describe a predetermined locus having a predetermined rule.

In order to accomplish the aforementioned and other objects, according to a fourth aspect of the present invention, there is provided an information reproducing apparatus for reproducing information by irradiating a light beam in an optical recording medium capable of forming marks for information recording in a plurality of three-dimensional directions so as to read the information as the marks at a predetermined position including a beam-waist and a circumference of the light beam, the apparatus comprising: a light beam condensing part for forming a recorded mark by moving a beam-waist of the light beam to a position to an optically recorded mark which has been previously recorded; and a moving mechanism for causing the beam-waist to be moved step by step so as to trace a predetermined locus having a predetermined rule.

In the above-described first through fifth aspects, the optical recording medium may comprise an optical disk having a disk-shape, and the information is recorded so as to describe the predetermined locus by scanning the light beam in a radial direction of the optical disk while rotating the optical disk by rotating means and by adjusting a beam-waist of the light beam in the depth direction of the optical disk.

In the first through fifth aspects, the predetermined locus may be formed by fixing a position of the beam-waist of the light beam at a predetermined position in accordance with the radial direction while the optical disk is rotated, and moving the position of the beam-waist in the depth direction of the optical disk so as to form the marks on a spiral locus of which every marks have a same distance from a center of the optical disk; and to form the marks step by step on the spiral locus by scanning the position of the beam-waist of the light beam in the radial direction.

In the first through fifth aspects, the predetermined locus may be formed by scanning the light beam in the radial direction while the optical disk is rotated, and by moving the beam-waist of the light beams o as to form the marks step by step on a spiral locus.

In the first through fifth aspects, the optical recording medium may comprise an optical rectangular-solid having a rectangular-shape including a block-, stick- and card-shape, and the marks are formed so as to describe the predetermined locus by changing a relative position between the optical recording rectangular-solid and the beam-waist of the light beam in an arbitrary three-dimensional direction.

In the first through fifth aspects, the optical rectangular-solid may have the block- or stick-shape, and the predetermined locus is described as a sine curve, by changing a relative position between the optical recording rectangular-solid and the beam-waist of the light beam in the three dimensional direction including the depth direction.

In the first through fifth aspects, the optical rectangular-solid may have the card-shape, and the predetermined locus is described as a spiral shape which is formed by moving the beam-waist from a center to any of corners or from any of corners to the center along an outer shape of the card and by moving a position of the beam-waist in the depth direction step by step so as to record the information as a rectangular spiral as the predetermined locus.

In the first through fifth aspects, relationship between a distance L on the predetermined locus between continuous two marks which are recorded by an irradiation of the light beam and a difference d of relative positions in the depth direction of the marks may satisfy $0<d/L<2.5$.

According to a fifth aspect of the present invention, there is provided an optical recording medium capable of forming therein marks at an arbitrary position in three-dimensional direction, using a light beam, the optical recording medium allowing information in a manner that an adjacent mark is recorded by moving a beam-waist of the light beam at an adjacent position to a previously recorded mark, and marks are formed step by step to describe a predetermined locus having a predetermined rule by moving the beam-waist so as to record the information.

In the fifth aspect, the optical recording medium may comprise a disk-shaped optical disk, and may allow information to be recorded so as to describe the predetermined locus by scanning the light beam in a radial direction of the optical disk while rotating the optical disk and by adjusting a position of the beam-waist of the light beam in the depth direction of the optical disk.

In the fifth aspect, the optical recording medium may comprise an optical rectangular-solid having a rectangular-shape including a block-, stick- and card-shape, and the marks may be formed so as to describe the predetermined locus by changing a relative position between the optical recording rectangular-solid and the beam-waist of the light beam in an arbitrary three-dimensional direction.

In the fifth aspect, the relationship between a distance L on the predetermined locus between continuous two marks which are recorded by the beam-waist of the light beam and a difference d of relative positions in the depth direction of the recorded marks may satisfy 0<d/L<2.5.

DESCRIPTION OF THE PREFERRED EMBODIMENTS

According to the present invention, an optical recording medium may be any one of a disk-shaped medium, a card-shaped medium, and a rectangular block-shaped medium thicker than a card, as long as the optical recording medium has a laminated recording layer of tens to hundreds layers, and recorded marks (recorded pits) formed in planar and depth directions in accordance with a predetermined rule, and as long as the optical recording medium is capable of recording information on the basis of the modulation in optical property caused by light irradiation.

The first preferred embodiment of an information recording apparatus according to the present invention comprises a mechanism for scanning focused light beams on the plane of an optical recording disk to record information, and a mechanism for spirally scanning the focused light beams in the optical recording disk.

The second preferred embodiment of an information reproducing apparatus according to the present invention comprises a mechanism for scanning focused light beams on the plane of an optical recording disk to reproduce information, and a mechanism for spirally scanning the focused light beams in the optical recording disk.

The third preferred embodiment of an optical recording disk, which is irradiated with focused light beams to form marks to record information, according to the present invention is characterized in that the positions of the recorded marks to be written are arranged spirally.

According to the information recording apparatus, the information reproducing apparatus and the optical recording disk in the first through third preferred embodiments, the positions (written positions) of the recorded marks to be written in the optical recording disk are arranged spirally. Such an optical recording disk is capable of carrying out a high-capacity recording operation since information is three-dimensionally written. In order to prevent the depths of the recorded marks written in the forelock from being greatly different from the depth of one recorded mark in a moving direction of beams, the recorded marks can be continuously reproduced without changing the position of the focal point of the light beams in the depth direction when the next recorded mark is reproduced after one recorded mark is reproduced. Moreover, if the variation in intensity of the reproducing light is fed back to the control of the position the focal point of the light beams, the producing operation can be continuously carried out for a longer time.

Therefore, the time required for a reproducing operation can be shorter than that in the conventional optical recording disk having laminated layers, each of which has the written positions of recorded marks arranged on a plane. That is, the conventional method requires a process for vertically moving a lens for focusing reproducing-light to detect the positions of the recorded marks of the next layer after the reproducing operation for the first layer is completed, and for measuring the intensity of the reproducing light at that time to detect a point, at which the variation in the intensity is largest or a point, at which the variation in the differential of the intensity of the reproducing light is largest. According to the present invention, this process is not required, so that it is possible to shorten the time required for a reproducing operation.

Furthermore, throughout the specification, the term "spiral" means a three-dimensionally formed spiral, not a spiral on a plane. In addition, the state that recorded marks are adjacent in a certain three-dimensional direction means a state that adjacent two of a plurality of recorded marks are arranged in a certain three-dimensional direction, so that it is not always required that all of a plurality of films should be arranged in the same direction. Therefore, the macroscopically observed arrangement of a large number of recorded marks may be any one of arrangements, in which a predetermined continuous locus, such as coil-spring-shaped, sinusoidal-shaped or zigzag-shaped locus, is described.

Moreover, the optical recording disk according to the present invention may be any one of media using any principles, as long as their optical properties are modulated by light irradiation to change reproducing light. For example, the optical recording disk may be a photorefractive medium having a refractive index which can be modulated by an internal electric field caused by light irradiation, or a photo-polymer medium having a refractive index which is modulated by a reaction caused in or between molecules by light irradiation. The photorefractive medium is particularly preferred. Since a photorefractive material has a high transmittance of visible light, it is possible to record the amount of information corresponding to tens to hundreds layers according to the thickness of the film. Moreover, if an organic photorefractive medium is used, it is possible to easily provide a large-area optical recording disk. The optical recording disk is more preferably an organic photorefractive medium capable of carrying out a write operation without applying an electric field.

Although the typical shape of the optical recording disk according to the present invention is a thin cylindrical shape, it should be limited thereto, but it may be any one of spherical, rectangular parallel-opipedic, cuboid, cubic and elliptic tabular shapes. Furthermore, the optical recording disk according to the present invention must have a thickness capable of writing information at least three-dimensionally. In addition, the information recording apparatus or information reproducing apparatus according to the present invention has only to adopt a recording or reproducing apparatus corresponding to the principle of an optical recording disk for use therein. Moreover, the information recording apparatus or information reproducing apparatus according to the present invention may be an information recording and/or reproducing apparatus capable of both recording and reproducing information.

Figure 1:
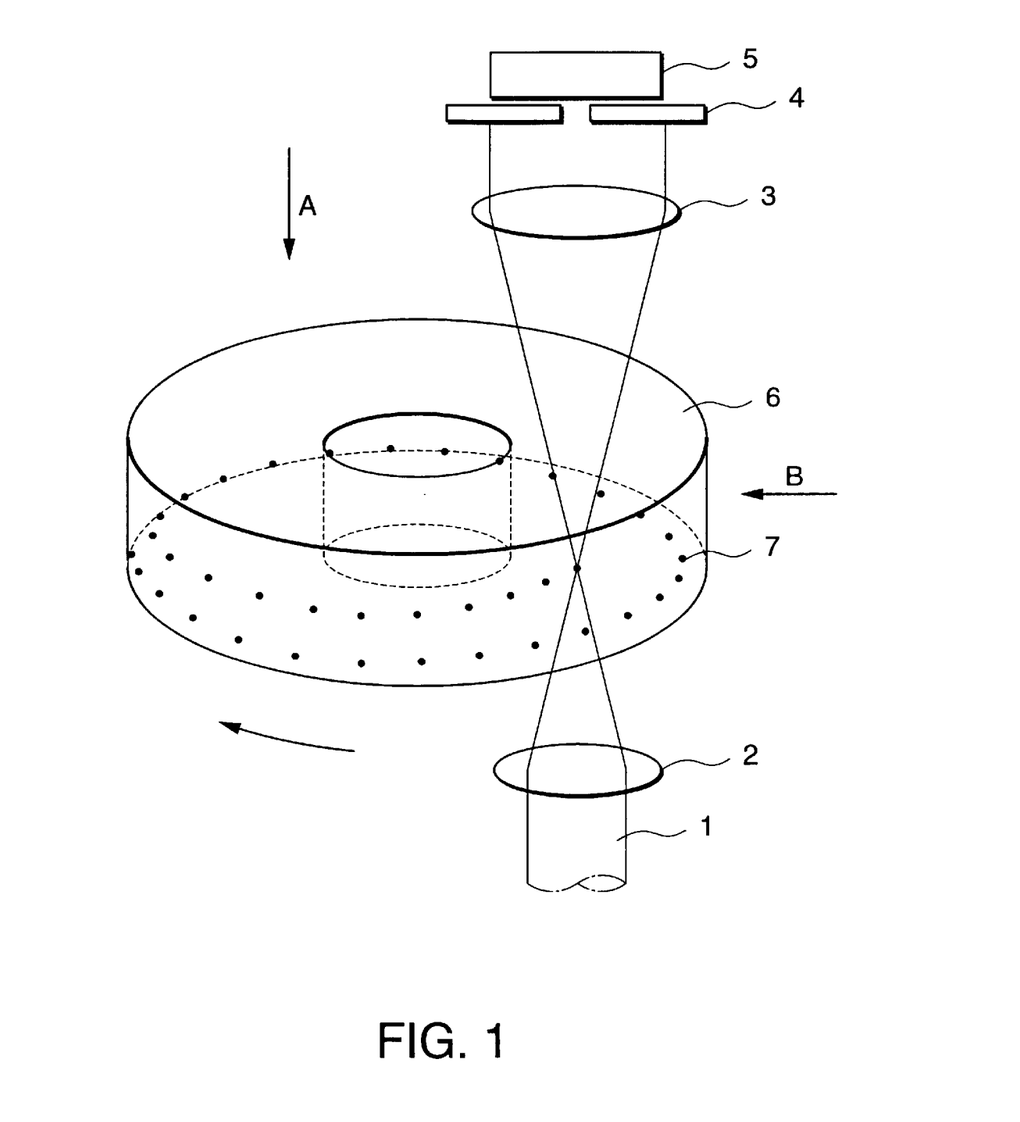
FIG. 1 is a bird's-eye view of an example of an information recording and/or reproducing apparatus and an optical recording disk according to the present invention.

FIG. 1 is a conceptual view showing an example of an information recording and/or reproducing apparatus and an optical recording disk according to the present invention. In the information recording and/or reproducing apparatus of FIG. 1, reference number 1 denotes a laser beam for a recording or reproducing operation, and 2 and 3 denote lenses for condensing the light beam 1 into an optical recording disk. Reference number 4 denotes an aperture, and 5 denotes a photodetector for detecting light. Reference number 6 denotes an optical recording disk, and 7 denotes marks recorded in the optical recording disk. According to the positions of the photodetector and aperture, the lens 3 may be an element other than the lens. In addition, a disk rotating mechanism (not shown) is provided for rotating the optical recording disk 6 in planer directions (or circumferential directions).

In addition, a lens moving mechanism (not shown) is provided for vertically moving the lens 2. The lens moving mechanism may be a stepping motor, a piezo-electric element or the like. According to the present invention, a mechanism (not shown) for moving the horizontal relative position between the lens and the disk may be provided for a planar recording/reproducing operation on a rectangular optical recording medium. The disk-shaped recording medium shown in the figure must have at least means for controlling the rotation of the disk, means for controlling the relative position between the disk and peripheral devices in the radial directions of the disk, and means for controlling the focusing position of the light beam.

The light beam 1 emitted from a light source passes through the optical recording disk 6 via the lens 2 to be incident on the lens 3 facing the optical recording disk 6 and the aperture 4 to be detected by the photodetector 5. The light beam 1 is modulated by any one of the recorded marks 7, which are recorded in the optical recording disk 6, to be received by the photodetector 5.

In the information recording and/or reproducing apparatus shown in FIG. 1, the light beam 1 focused by simultaneously operating the disk rotating mechanism and the lens moving mechanism is spirally scanned in the optical recording disk 6.

With this construction, the operation of the information recording and/or reproducing apparatus will be described below. First, a method for recording information in the optical recording disk will be described below.

When information is recorded in the optical recording disk 6, the optical recording disk 6 is irradiated with the light beam 1 from a light source (not shown) arranged below the optical recording disk 6, and the light beam 1 is focused by the lens 2. The recorded marks 7 are written into the optical recording disk 6 at focal points, at which the intensity of the focused light beam is maximum (the formed recorded marks are expressed by black circles in FIG. 1).

Moreover, when the optical recording disk 6 is rotated by the disk rotating mechanism in both directions while the lens 2 for condensing the light beam 1 is moved upward by the lens moving mechanism, the focal point of light moves spirally in the optical recording disk, so that it is possible to cause the recorded marks 7 to be spirally arranged in the optical recording disk. That is, the recorded marks are written spirally by relatively moving the optical recording disk in a direction which is not parallel to the rotating direction of the optical recording disk. At this time, the rotation of the optical disk 6 and the movement of the lens 3 are carried out at predetermined speeds.

On the other hand, there are two reproducing methods as follows.

In one method, a reproducing light beam, which has a weaker intensity than that of a recording light beam or a wavelength that is different from that of the recording light beam, is focused into an optical recording disk. At this time, the focal point of the light beam is set to deviate slightly upward or downward from the written position of a recorded mark. Since the refractive index of a portion corresponding to the recorded mark is different from the refractive index of a region, in which no write operation has been carried out, the intensity pattern of the reproducing light varies only when irradiation is carried out so that the focal point of the reproducing light beam approaches the recorded mark. If a photodetector is provided so as to detect a part of the reproducing light passing through the photodetector, it is possible to detect the presence of the recorded mark on the basis of the modulation in intensity. At this time, if the focal point is coincident with the written position of the recorded mark, the intensity distribution of the reproducing light is not different from a case where no recorded mark exists.

In the other method, the optical recording disk is provided with a reflective layer. Similar to the above-described method, the optical recording disk is irradiated with a reproducing light beam. This reproducing light beam reflects on the reflective layer to pass through the optical recording disk twice, i.e., to return to the plane of incidence, to be detected by the photodetector as reproducing light.

Figure 5:
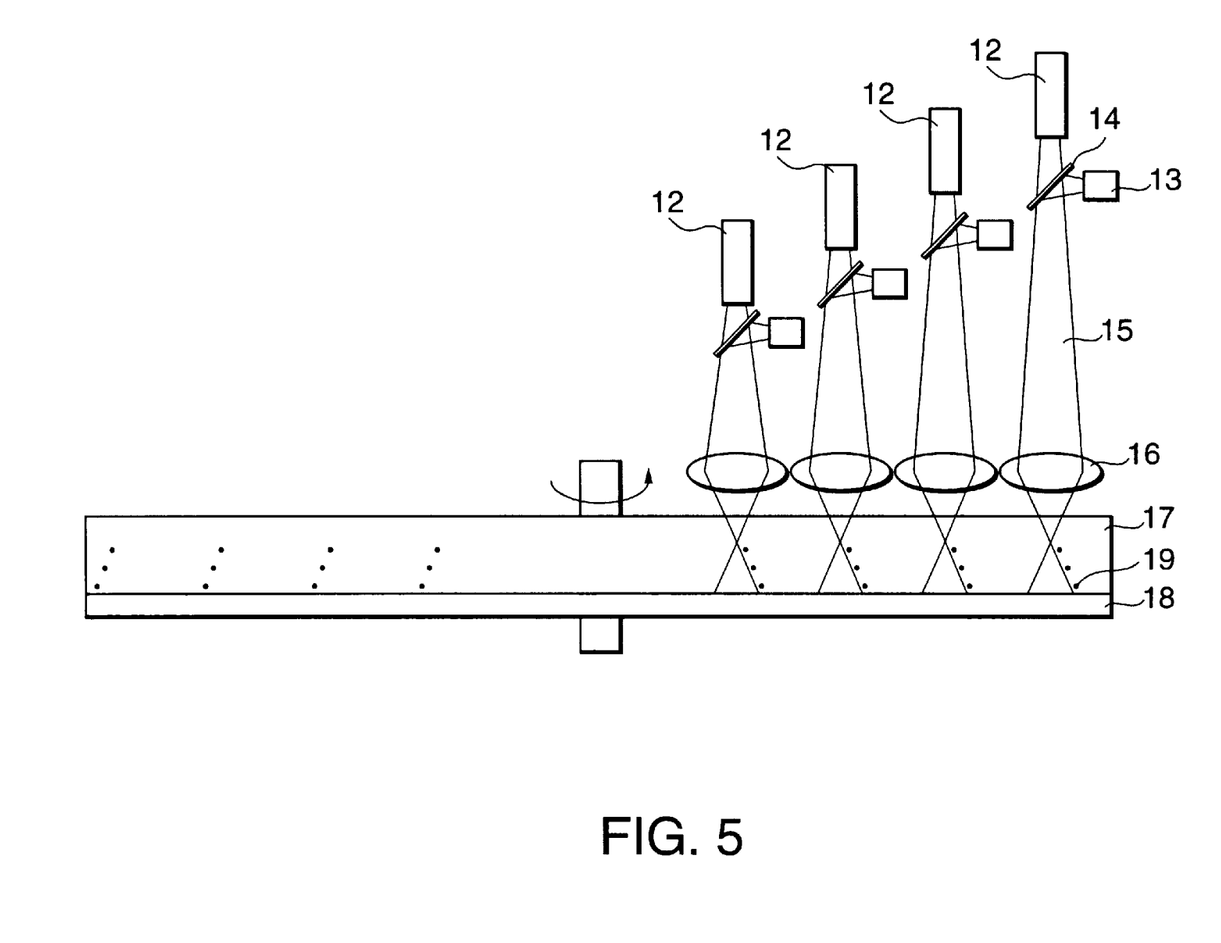
FIG. 5 is a cross section view of an example of an information recording and/or reproducing apparatus and an optical recording disk according to the present invention.

The former method is shown in FIG. 1, and the latter method is shown in FIG. 5, which will be described later.

In either case, since the intensity pattern of reproducing light varies in accordance with the presence of the recorded mark, it is possible to recognize the presence of the recorded mark by, e.g., measuring the intensity of the central portion of reproducing light. For example, when the optical recording disk is a photorefractive medium, the recorded mark portion is formed by the modulation in refractive index. Therefore, the recorded mark portion serves as a lens, so that the central portion of reproducing light gets dark or light in accordance with the position of the beam-waist of the reproducing light. On the other hand, this modulation of the reproducing light does not occur at a portion having no recorded mark. Therefore, if the intensity of the central portion of the reproducing light is detected, the presence of the recorded mark is detected.

In FIG. 1, the optical recording disk 6 having spirally arranged recorded marks is irradiated with a reproducing light beam 1, and light beam passing through the optical recording disk 6 is detected by the photodetector 5 as a reproducing light beam.

During a reproducing operation, the optical recording disk 6 is rotated in a planar direction (or a circumferential direction) at the same speed as that previously set during a recording operation. Thus, after the presence of the recorded mark is detected at the initial written position, the optical recording disk 6 is irradiated with the reproducing light beam at the next written position. At this time, if the position of the lens 3 is not changed, the written position deviates slightly from the focal point of the light beam. However, since adjacent written positions are close to each other, the deviation is slight even if the focal point deviates slightly. Therefore, the intensity of reproducing light varies, so that the presence of the recorded mark can be continuously detected.

If reproducing of the recorded mark is continued, the deviation of the focal point from the recorded mark will be large and the presence of the recorded mark can not be detected. Therefore, it is required to provide a mechanism for feedback of the modulation in intensity of reproducing light to the lens moving mechanism in order to correct the vertical position of the lens for condensing the light beam 1. The focal point is thus corrected, so that it is possible to sequentially reproduce information written at the written positions of the spiral-arranged recorded marks.

Furthermore, in the information recording apparatus or information reproducing apparatus according to the present invention, the mechanism for spirally scanning the focused light beam in the optical recording disk may be any one of mechanisms having such a function, and it should not be limited to the above described combination of the disk rotating mechanism and the lens moving mechanism.

Figure 2:
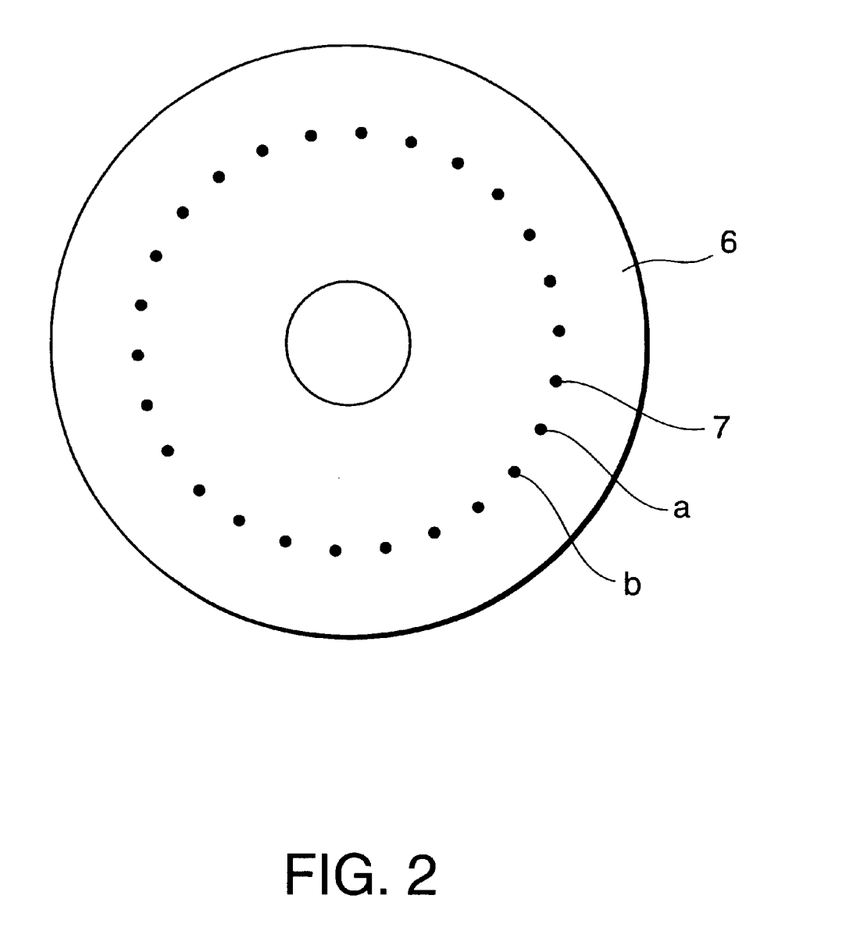
FIG. 2 is a plane view of the optical recording disk of FIG. 1, which is viewed in a direction of arrow A in FIG. 1.
Figure 3:
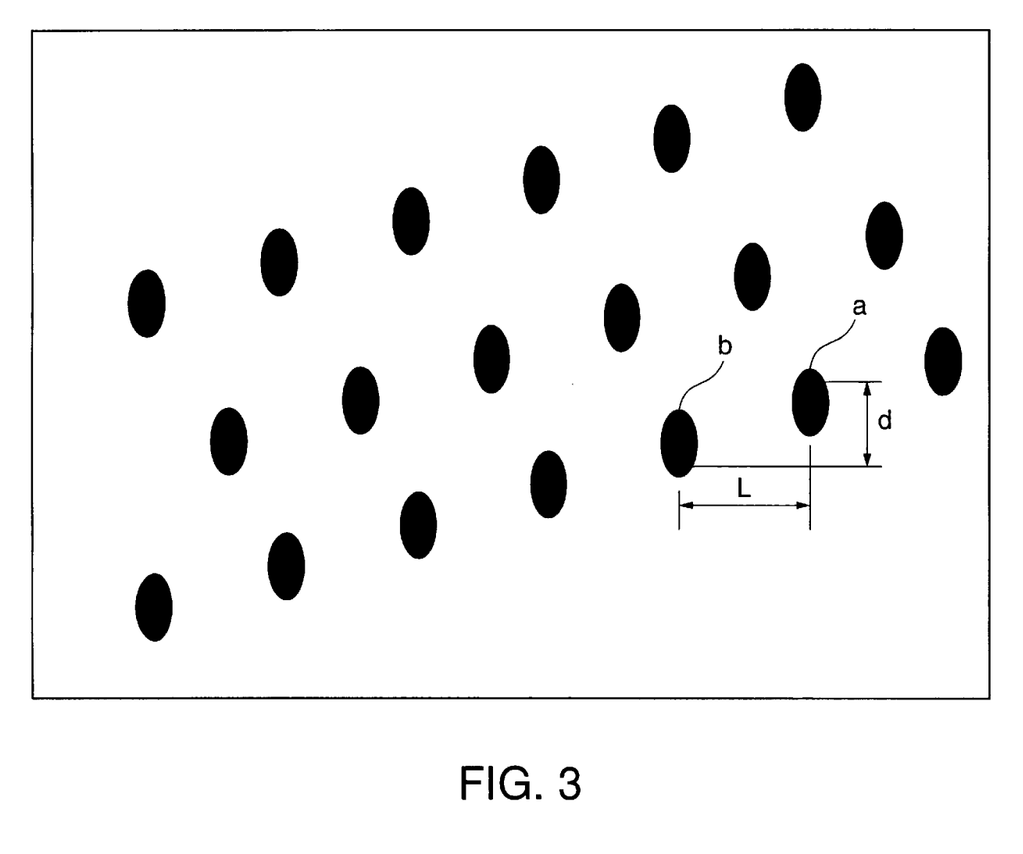
FIG. 3 is a plane view of a front view of the optical recording disk of FIG. 1, which is viewed in a direction of arrow B in FIG. 2.
Figure 6A:
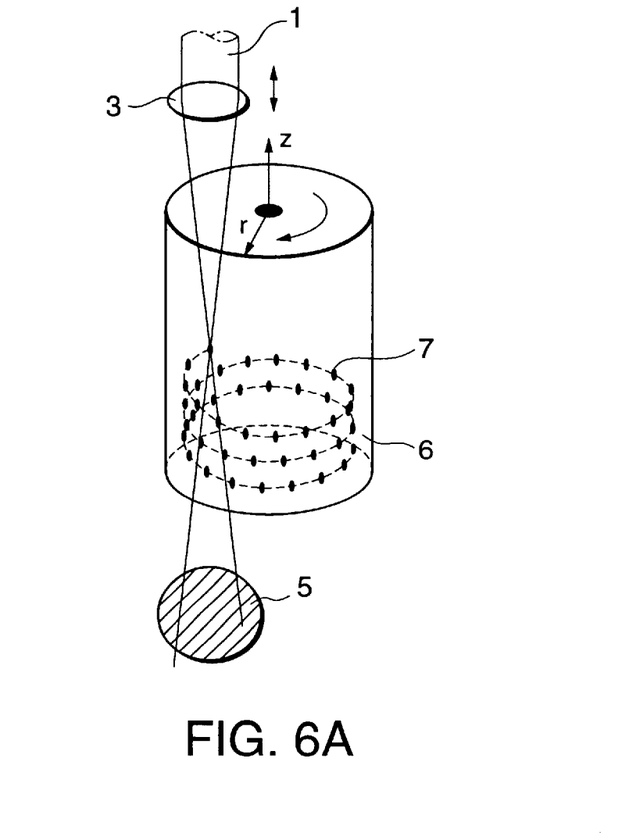
FIG. 6A is a bird's eye view of a cylindrical optical recording medium according to the present invention.
Figure 6B:
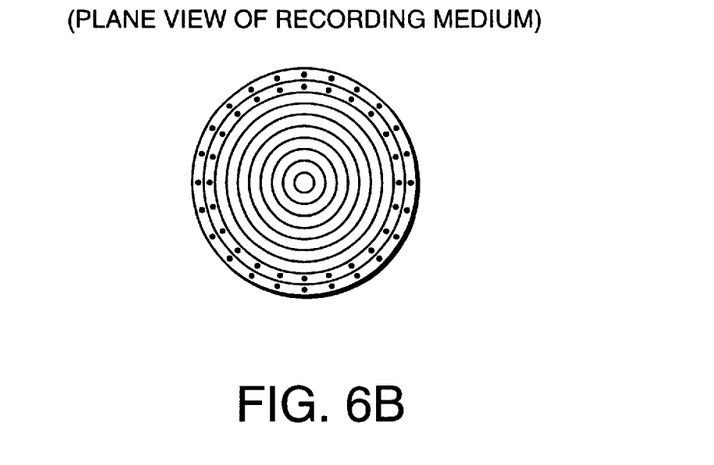
FIG. 6B is a plan view thereof.

An example of the arrangement of recorded marks of the optical recording disk according to the present invention is shown in FIGS. 2 and 3. FIGS. 6A and 6B show a case where recorded marks are cylindrically arranged by the recording form of FIG. 1. Recording is carried out so that recorded marks are cylindrically arranged by moving the lens upward while rotating the disk. Then, the marks are recorded while moving the lens so as to shorten the distance from the center of the cylinder of the focus. Then, usual recorded marks are arranged inside of the arrangement of the recorded marks by moving the lens downward while rotating the disk. By repeating this method, cylindrically arranged marks are formed as an annual ring.

FIG. 2 is a diagram of the optical recording disk of FIG. 1, which is viewed in a direction of arrow A. In FIG. 2, the positions of the formed recorded-marks 7 are always apart from the center of the optical recording disk 6 at a constant distance. By thus writing information, it is possible to write addresses on the surface of the optical disk to facilitate addressing. However, if the recorded marks 7 are formed so that each of upper and lower marks are aligned, when the distance between upper and lower marks is narrow, there is some possibility that the error rate increases. Therefore, it is desired to increases the distance or to prevent the upper and lower recorded marks from being overlapped.

Figure 7A:
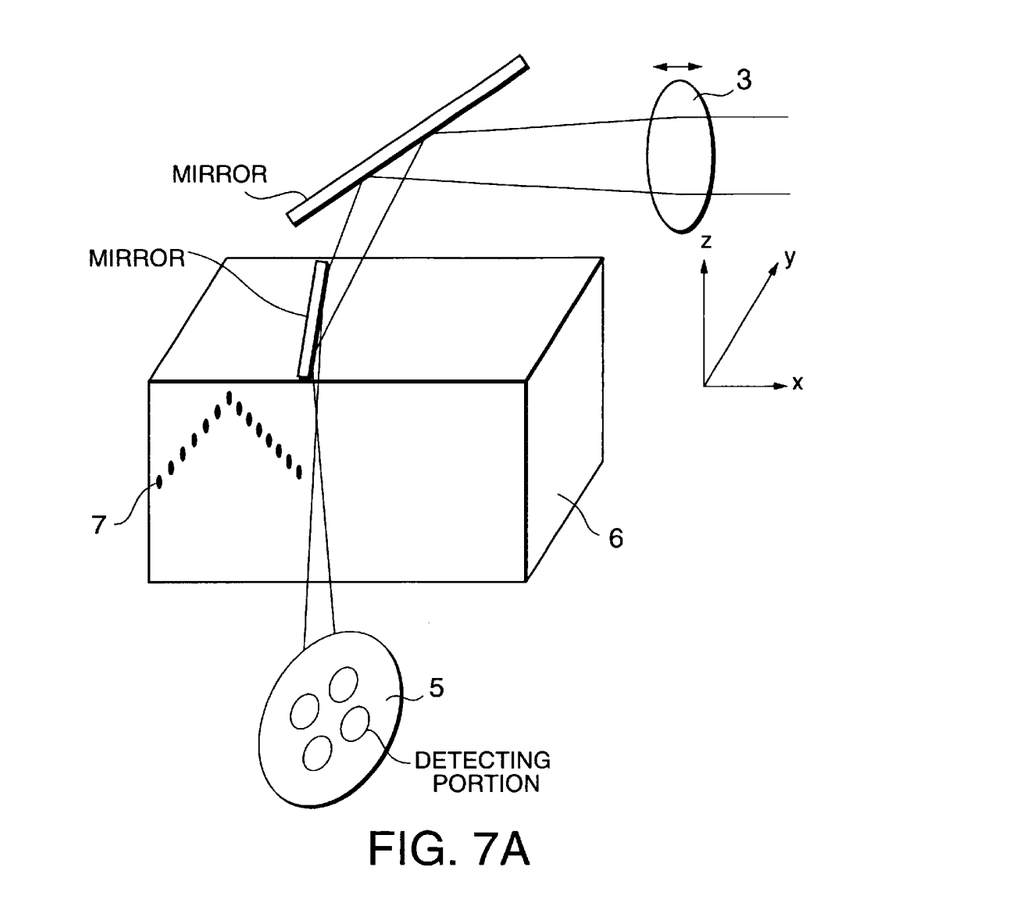
FIGS. 7A and 7B are bird's eye views of a rectangular-shaped optical recording medium according to the present invention, which also conceptually shows recorded marks.
Figure 7B:
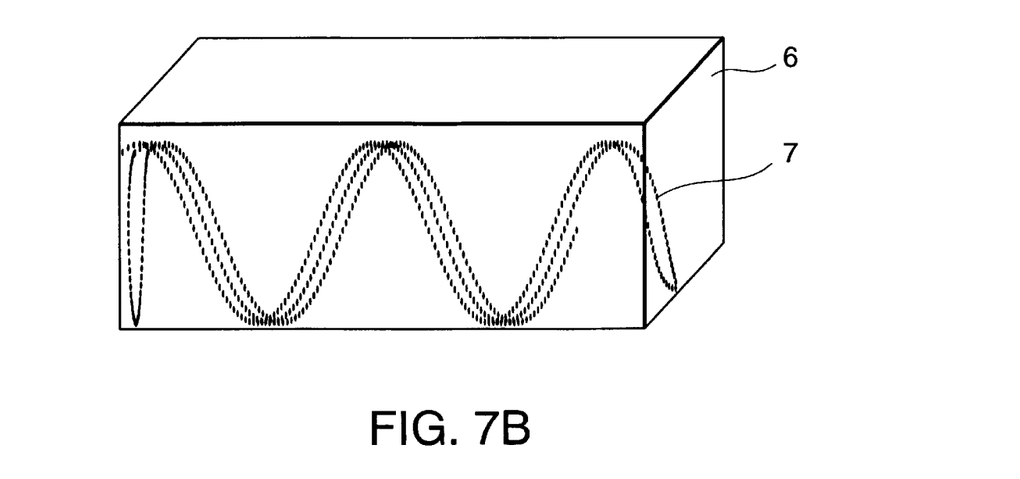

FIG. 3 is a diagram of the optical recording disk of FIG. 1, which is viewed in a direction of arrow B. Since the recorded marks are formed by vertically moving the lens 2 for focusing the light beams 1 while rotating the optical recording disk 6, the recorded marks 7 are arranged so as to extend in oblique directions. FIG. 7A is a conceptual diagram showing recording and reproducing operations in a stick-shaped recording medium. FIG. 7B is a bird's eye view showing an optical rectangular-solid together with a locus of recorded marks. A monochromatic light beam focused by a lens is introduced into on an optical recording medium at an optical position by a mirror. The mirror in FIG. 7A is one of the mirrors in a micro mirror array, and the position of the array can be moved in any directions of x, y and z. The position of the focus of light is controlled in accordance with the positions of the lens and the mirror array, the selection of the mirror driven in the mirror array, and the angle of the micro mirror. By changing any one of them, it is possible to adjust the relative positions between the mirror array, the lens, and the recording medium. For example, the arrangement of the recorded marks at that time can have a sine wave shape or a zigzag shape using an apparatus having means for controlling the positions of the recording medium in x and y directions, means for moving the lens in x and y directions, and means for moving the mirror array in x and y directions.

Preferably, the relationship between a distance L between spirally arranged adjacent two recorded marks in a planar direction and a difference d of relative positions in a depth direction meets "0<d/L<2.5". That is, there is preferably a portion meeting "0<d/L<2.5" between the distance L between one recorded mark a of the recorded marks and a recorded mark b before or behind the recorded mark a when recording is spirally carried out, and the difference d in the depth direction (shown in FIG. 3). The portion satisfying this condition can be continuously read since the variation in focal point of the focused beam is within an allowable range of defocusing even if the focal point of the focused beam deviates. In addition, the variation in intensity of reproducing light can be easily fed back to the control of the position of the lens 2.

Between continuous two recorded marks, the relationship between the distance L in a direction perpendicular to the longitudinal direction of the marks and the difference d in a direction parallel to the longitudinal direction thereof preferably satisfies "0<d/L<2.5". If this condition is satisfied, even if the focal point of the focused beam deviates, the deviation in the focal point of the focused beam is within the allowable range of defocusing, reading can be continuously performed. In addition, the modulation in intensity of reproducing light can be easily fed back to the control of the position of the lens. This can be understood as follows. Usually, marks recorded by an optical recording operation as the modulation of refractive index are formed as a three-dimensional ellipsoid of extending in a recording light propagating direction.

It is assumed that a region, in which the modulation of refractive index occurs, is recorded as a mark having a longitudinal length of 2.5 $\mu$m and a radius of 0.3 $\mu$m in a direction extending from the longitudinal direction. If this recorded mark has been recorded spirally at the same depth, it is not required to control the position of the reading light beams so that reading is continuously carried out without changing the position of the focus point. Then, a case where the horizontal positions of the marks are gradually changed in order to carry out a recording operation will be considered. For example, assuming that the distance between adjacent marks in a direction extending from the longitudinal direction of the marks is 0.6 μm, the distance L between the centers of the adjacent marks is 1.2 μm. Since the longitudinal size of the mark is 2.5 μm, the difference d in the longitudinal direction of the mark is 2.5, or less at the maximum. Therefore, the relationship "d/L<2.5" is preferably satisfied.

Figure 4:
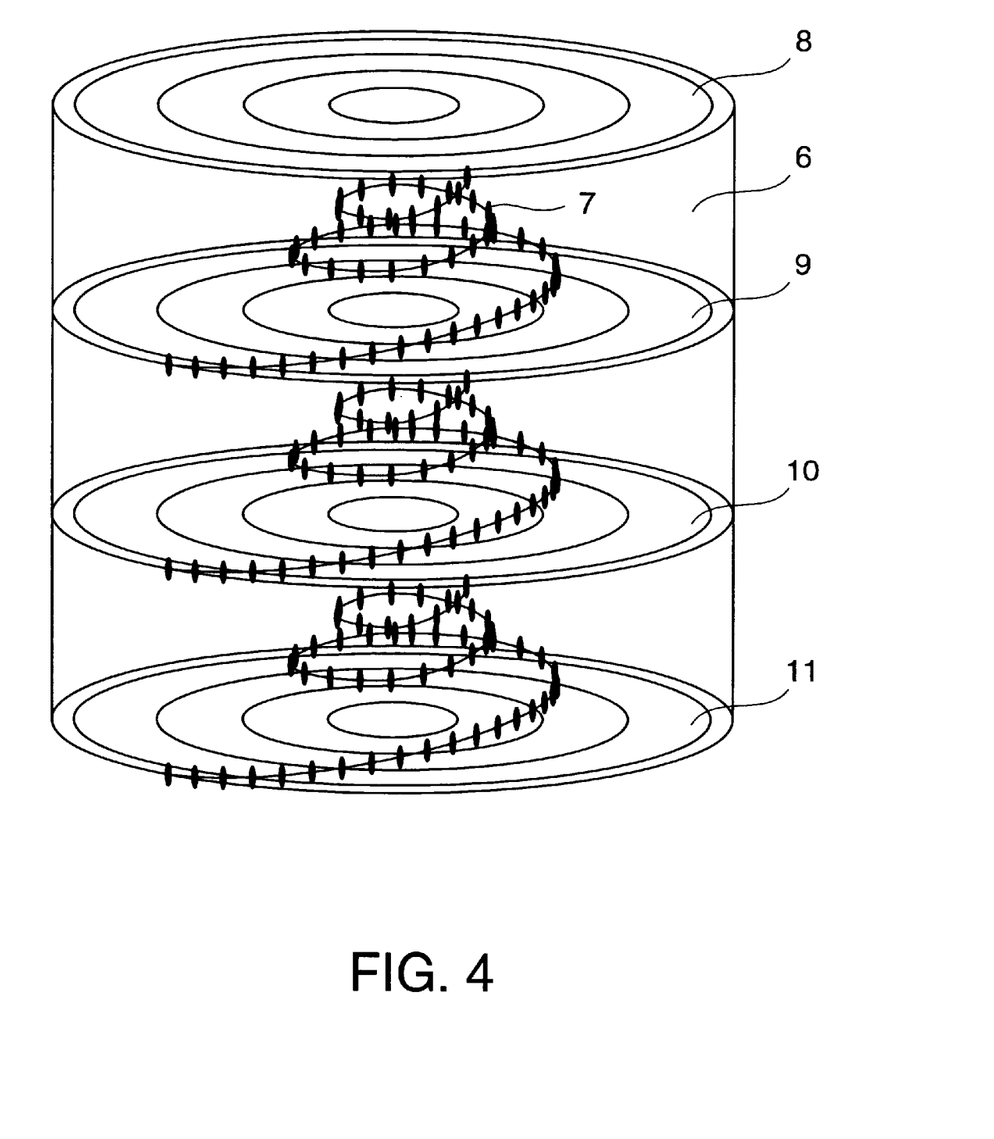
FIG. 4 is a bird's eye view of an example of the arrangement of recorded marks according to the present invention.

FIG. 4 shows another example of the arrangement of recorded marks according to the present invention. FIG. 4 shows a method for laminating a plurality of layers, in which recorded marks are formed, to arrange the recorded marks spirally on the connecting portion between adjacent layers. In FIG. 4, the optical recording disk 6 has a plurality of layers (layers 8, 9, 10 and 11), in which recorded marks are arranged on a plane. In a portion between adjacent layers, e.g., between a recorded mark at the end of the recording operation in the layer 9 and a recorded mark at the head of the recording operation in the layer 9, recorded marks 7 are arranged spirally. This arrangement is formed by the following method.

That is, the optical information recording and/or reproducing apparatus of FIG. 1 is provided with a mechanism for moving the light source or the optical recording disk 6 in a radial direction of the disk. The lens 3 is fixed, and the optical recording disk 6 is rotated while the optical recording disk 6 or the light source is moved in a radial direction of the optical recording disk 6, so that a layer, in which recorded marks are arranged on a plane, is formed. Then, if the lens 3 is moved upward while the optical recording disk 6 is rotated, the light beams is spirally scanned similar to the recording operation, to form a portion, in which recorded marks are arranged spirally.

If this arrangement is adopted, if a mechanism for causing the variation in output of reproducing light to be fed back to the movement of the position of the lens 2 in order to move the position of the focal point of reproducing light beams is used when the reproducing operation of, e.g., the layer 9, is carried out after the reproducing operation of the layer 8 in FIG. 4 is completed, it is possible to continuously carry out reading and high-capacity recording operations without carrying out a process for detecting recorded marks in the depth direction.

On the other hand, in the information recording apparatus or information reproducing apparatus according to the present invention, a single light beam may not be only incident on a single optical recording disk for a recording or reproducing operation, but two or more light beams may also be simultaneously incident thereon. Thus, the recording or reproducing operation can be processed in parallel. For example, FIG. 5 shows a conceptual diagram of an information recording and/or reproducing apparatus for causing an optical recording disk to be irradiated with a plurality of light beams. In FIG. 5, reference number 12 denotes light sources for light beams, and 13 denotes photo-detectors for detecting reproducing light. Reference number 14 denotes half mirrors, 15 denotes light beams for recording or reproducing operations, and 16 denotes lenses for condensing the light beams into an optical recording disk. Reference number 17 denotes the optical recording disk, 18 denotes a reflective layer, and 19 denotes recorded marks recorded in the optical recording disk.

This information recording and/or reproducing apparatus is equipped with a mechanism for vertically moving the lens 16 while rotating the optical recording disk 17. By this mechanism, the optical beams 12 are spirally scanned, so that the recorded marks are arranged spirally. Since the plurality of light sources are provided, a plurality of spiral arrangements of recorded marks are formed. By vertically moving the lens 16 while rotating the optical recording disk 17 during a reproducing operation, the reproducing light beams 15 are spirally scanned. Moreover, transmitted light having a intensity pattern changed in accordance with the presence of a recorded mark reflects on the reflective layer 18 to be returned toward the plane of incidence. The returned light is detected by the photodetector 13 as reproducing light.

Examples of the present invention will be described below.

EXAMPLE 1

An unrecorded optical recording disk was produced by the following method. The recording material of the optical recording disk in Example 1 was a photo-polymer wherein molecules of a portion irradiated with focused light beams were bridged to increase its molecular weight to increase the refractive index of the region. Once the refractive index of this recording material is modulated, the modulated refractive index is semi-permanently held, and it is difficult to restore the modulated refractive index.

A film of this photo-polymer was formed as a transparent substrate having a diameter of 12 cm to form an optical recording disk. The thickness of the photo-polymer film was 2 mm.

Using the information recording and/or reproducing apparatus of FIG. 1, which further comprises a mechanism for moving an optical recording disk in radial directions, information was recorded in the above described unrecorded optical recording disk.

First, the lens 2 was fixed, and the optical recording disk 6 was moved in a radial direction of the optical recording disk 6 while the optical recording disk 6 was rotated, so that a layer, in which recorded marks were arranged on a plane, was formed by exposure of poise laser beam. Then, when the lens 2 was moved upward while the optical recording disk 6 was rotated, the light beam was spirally scanned similar to the recording operation, so that a portion, in which recorded marks were spirally arranged, was formed. The optical recording disk obtained by repeating this process had 80 layers, in each of which recorded marks were spirally arranged on a plane, and recorded marks were spirally arranged between the adjacent layers. The arrangement of the recorded marks was substantially the same as that shown in FIG. 4.

The reproducing operation of this optical recording disk was carried out by the same apparatus using a semiconductor laser having a wavelength of 680 nm as a light source. First, similar to the recording operation, the optical beam 1 for a reproducing operation was scanned on the optical recording disk 6. The transmitted light from the optical recording disk 6 was detected by the photodetector 5 as reproducing light. In this case, a mechanism for causing the variation in intensity of the reproducing light to be fed back to the lens moving mechanism to correct the vertical movement of the lens 2 for condensing the light beam 1 was provided.

As a result, by the optical recording disk, it was possible to realize a recording density of $10^9$ bits/cm$^3$, and to carry out a reading operation at 1.5 Gbits/s.

COMPARATIVE EXAMPLE 1

Using the information recording and/or reproducing apparatus of FIG. 1, recording and reproducing operations were carried out in the same unrecorded optical recording disk as the optical recording disk used in Example 1. During the recording operation, an argon laser was used as a light source for light beams. However, the lens 3 was not moved vertically while rotating the optical recording disk 6, and the laser was moved in a radial direction of the optical recording disk 6 while rotating the optical recording disk 6, so that a layer, in which recorded marks were spirally arranged on a plane, was first formed as a first layer. The next layer was written spirally similar to the first layer at a depth sufficiently apart from the allowable range of defocusing so that the error rate was sufficiently small. Similarly, 80 layers were written.

The arrangement of the recorded marks of the obtained optical recording disk included 80 layers, in each of which recorded marks were arranged spirally on a plane.

The reproducing operation of this optical recording disk was carried out by the same apparatus using a semiconductor laser having a wavelength of 680 nm as a light source. Similar to the recording operation, the optical beam 1 for a reproducing operation was scanned on the optical recording disk 6. The transmitted light from the optical recording disk 6 was detected by the photodetector 5 as reproducing light. During the reproducing operation, it is required to carry out a process for detecting the position of a written second layer in the depth direction in order to start the reproducing operation of the second layer after the reproducing operation of the first layer was completed. Specifically, this detecting method causes the lens for condensing the reproducing light to vertically scan to measure the intensity of the reproducing light at that time to detect a point, at which the intensity is largest, or a point, at which the differential of the intensity of the reproducing light is large.

Although the recording capacity was substantially the same as that in Example 1, the reading rate was 2 Kbits/s when a reproducing operation was carried out by the same method as the recording method.

EXAMPLE 2

An unrecorded optical recording disk was produced by the following method. The recording material of the optical recording disk in this example was a mixture of an oxadiazole derivative, a bisphenol A type polycarbonate, particles of titanyl phthalocyanine, and $C_{70}$ exhibiting non-linear optical properties at a ratio of 200:300:10:1 by weight. This mixture was dissolved in toluene to be cast on a substrate of quartz to be dried to be hot formed to produce a film having a thickness of 200 $\mu$m to obtain an optical recording disk.

Using the same apparatus as that shown in FIG. 5, information was recorded and reproduced in the unrecorded optical recording disk. For the recording operation, argon lasers of 20 divided beams in total were used to spirally form $2 \times 10^{20}$ recorded marks in total to obtain an optical recording disk. For the reproducing operation, 20 arrayed semiconductor lasers having a wavelength of 800 nm were used as light sources to cause reproducing light beams to be scanned on the optical recording disk similar to the recording operation. The reflected light from the optical recording disk was detected by the photodetector as reproducing light. In this case, a mechanism for causing the modulation in intensity of the reproducing light to be fed back to the lens moving mechanism to correct the vertical movement of the lens for condensing the light beam was provided. During the recording and reproducing operations, the position of the focal point, at which the laser beams were focused, was controlled by vertically moving the lens by means of a stepping motor or a piezoelectric element, rotating the optical recording disk and moving the laser in radial directions. As a result, it was possible to realize a recording density of $10^{13}$ bits/cm$^3$, and to carry out a reading operation at 2 Gbits/s.

COMPARATIVE EXAMPLE 2

Using the same optical recording disk as that in Example 2, information was recorded and reproduced. During the recording operation, only one argon laser was used, and recorded marks were written concentrically by only rotating the optical recording disk and radially moving light beams without vertically moving the position of the focal point. After one layer was written, the lens was moved vertically, and the next layer was written concentrically in the same manner. Thus, $2 \times 10^{20}$ recorded marks were formed to obtain an optical recording disk. During the reproducing operation, only one semiconductor laser having a wavelength of 800 nm was used, and reproducing light beams were scanned on the optical recording disk similar to the recording operation. The reflected light from the optical recording disk was detected by the photodetector as reproducing light. As a result, the reading rate was 1 Mbits/s.

EXAMPLE 3

Figure 8:
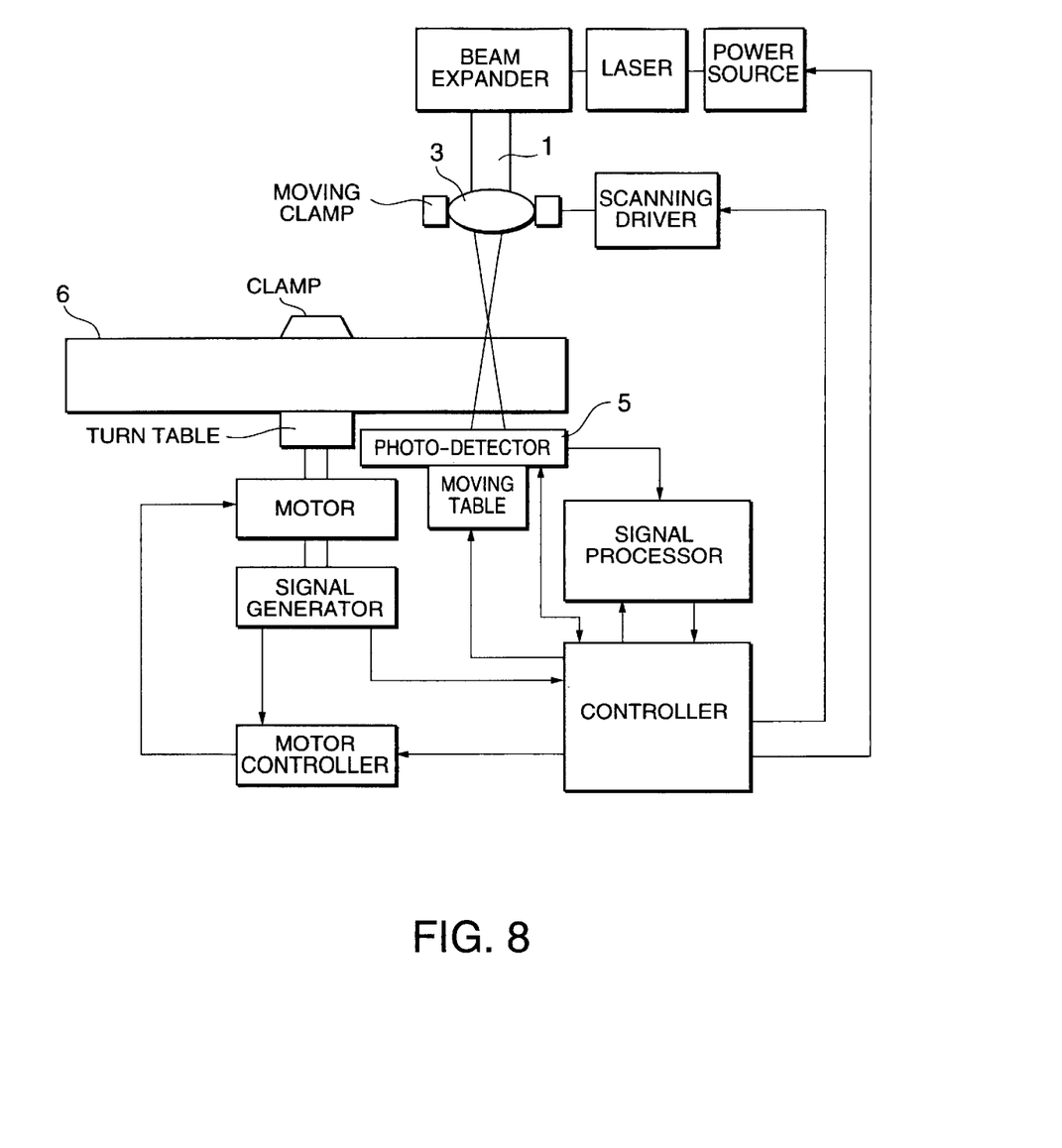
FIG. 8 is a block diagram schematically showing a recording and/or reproducing apparatus according to the present invention.

A cylindrical recording medium having a radius of 4 cm and a length of 4 cm was produced as shown in FIG. 6A, and the same recording operation as that in FIG. 6A was carried out. First, the horizontal position of the lens was fixed at a position that was farthest away from the center of the cylinder, and moved vertically at a constant velocity. While the optical disk was rotated, the optical disk was irradiated with laser pulse light, so that recorded marks were recorded while describing a coil-spring-shaped locus as shown in FIG. 6A. When the recording operation was carried out from the bottom to the top, the lens was moved by 0.5 $\mu$m in a radial direction of the cylinder. Then, the lens was scanned from the top to the bottom to carry out a recording operation. When the recording operation was carried out to the bottom, the lens was moved by 0.5 $\mu$m in a radial direction of the cylinder similar to the above described movement. This operation was repeated to carry out a recording operation cylindrically for a radius of from 3.8 mm to 5 mm. The block diagram of the used apparatus is shown in FIG. 8. As a result, it was possible to achieve $10^{13}$ bit/cm$^3$ and a reading rate of 2 Gbps.

EXAMPLE 4

Figure 9A:
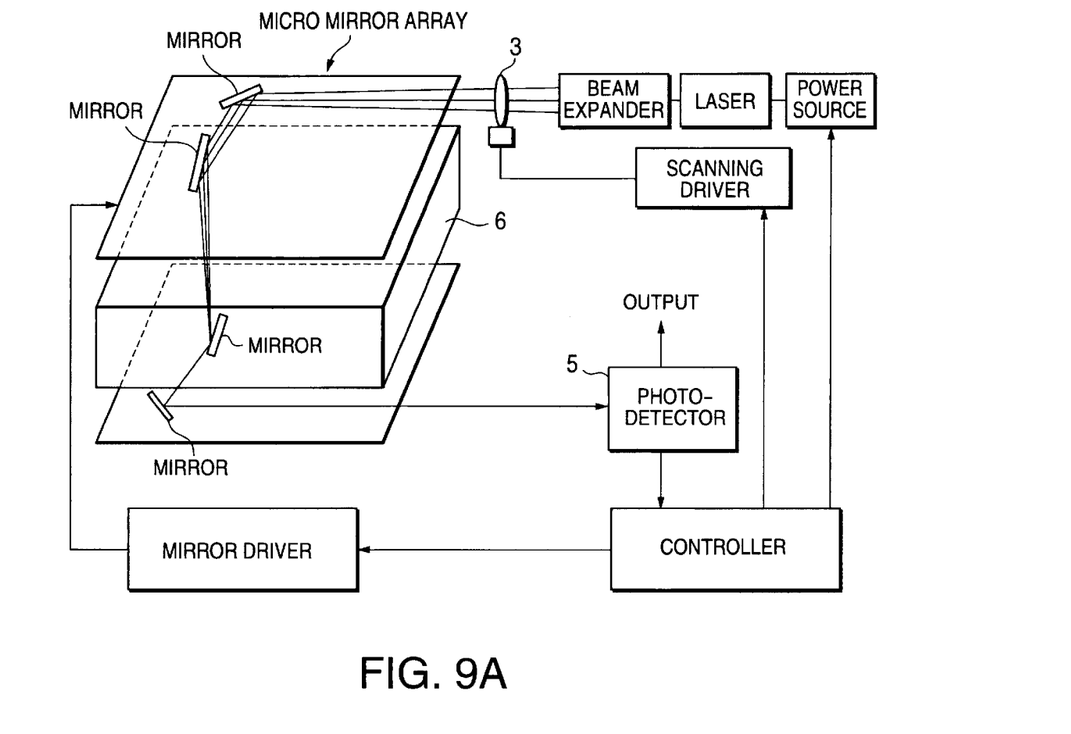
FIG. 9A is a block diagram schematically showing a recording and/or reproducing apparatus using a mirror array.
Figure 9B:
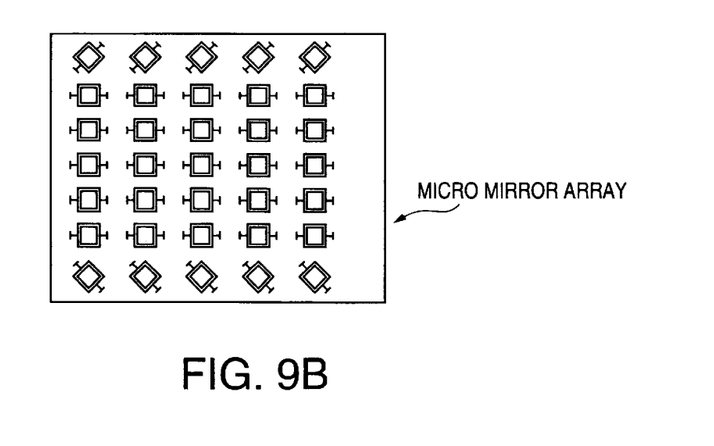
FIG. 9B is a plan view of the mirror array.

A stick-shaped recording medium 6 having a size of 1 cm×4 cm×2 cm as shown in FIGS. 7A and 7B was produced, and the same recording operation as that in FIGS. 7A and 7B was carried out. That is, marks were recorded linearly in a direction of x of the recording medium while controlling the angle of the mirror and the position of the lens so that the recorded marks were arranged in the form of a sine wave. Then, the recording of marks was repeated so that the marks were arranged at positions of a slightly shifted phase. By repeating this operation was repeated, marks were recorded on the xz-plane at an optical position y1 in a direction of y. Then, marks were also recorded on the xz-plane at a position of y2 by moving the recording medium in a direction of y. By repeating this operation, recorded marks were formed on the whole recording medium. The block diagram of the used apparatus is shown in FIGS. 9A and 9B. As a result, it was possible to achieve $10^{13}$ bit/cm$^3$ and a reading rate of 2 Gbps.

As described above, according to the present invention, it is possible to provide an optical recording disk and an information recording and/or reproducing apparatus, which can three-dimensionally record high-density information and which can record and/or reproduce the information at a high speed.

What is claimed is:

1. An information recording method for recording information into an optical recording medium, said information being reproduced by irradiating a light beam for reproducing through a lens, changing a position of a beam-waist of the light beam both in depth and planar directions of said optical recording medium, and detecting an intensity pattern of said light beam for reproducing which has passed through said optical recording medium, said method comprising:

forming at least two marks of a plurality of marks, said at least two marks having different depths within a depth range of the optical recording medium such that said light beam for reproducing is capable of reproducing information of each of the at least two marks while maintaining a same distance between said lens and said optical recording medium; and forming a third mark of said plurality of marks in said depth range so that said light beam for reproducing is capable of reproducing information of each of said at least two marks and said third mark while maintaining said same distance between said lens and said optical recording medium, and said plurality of marks are formed to describe a continuous predetermined three-dimensional track or locus.

2. An information recording method for an optical recording medium as set forth in claim 1, wherein said optical recording medium comprises an optical disk having a disk-shape, and said plurality of marks are formed to describe said continuous predetermined three-dimensional track by scanning said light beam in a radial direction of said optical disk while rotating said optical disk by rotating means and by adjusting said beam-waist of said light beam in a depth direction of said optical recording disk.

3. An information recording method for an optical recording medium as set forth in claim 2, wherein said continuous predetermined three-dimensional track is formed by fixing a position of said beam-waist of said light beam at a predetermined position in accordance with said radial direction while said optical disk is rotated, and moving said position of said beam-waist in the depth direction of said optical disk to form a first number of marks of said plurality of marks on a spiral three-dimensional track of which every mark has a same distance from a center of said optical disk, and to form a second number of marks of said plurality of marks on said spiral three-dimensional track by changing said predetermined position of said beam-waist of said light beam in said radial direction and then repeating moving said position of said beam-waist in the depth direction of said optical disk while said optical disc is rotated.

4. An information recording method for an optical recording medium as set forth in claim 2, wherein said continuous predetermined three-dimensional track is formed by scanning said beam-waist in both said radial direction and said depth direction while said optical disk is rotated to form said plurality of marks on a spiral three-dimensional track.

5. An information recording method for an optical recording medium as set forth in claim 2, wherein a relationship between a distance L in a planar direction between continuous two marks which are recorded by an irradiation of said light beam and a difference d of relative positions in said depth direction of said two marks satisfies $0<d/L<2.5$.

6. An information recording method for an optical recording medium as set forth in claim 1, wherein said optical recording medium comprises an optical rectangular-solid material having a rectangular-shape including a block-shape or a stick-shape, and said plurality of marks are formed to describe said continuous predetermined three-dimensional track by changing a relative position between said optical rectangular-solid material and said beam-waist of said recording light beam in an arbitrary three-dimensional direction.

7. An information recording method for an optical recording medium as set forth in claim 6, wherein said optical rectangular-solid material has said block-shape or stick-shape, and said continuous predetermined three-dimensional track is described as a sine curve, by changing a relative position between said optical rectangular-solid material and said beam-waist of said light beam in a three-dimensional direction including a depth direction.

8. An information recording method for an optical recording medium as set forth in claim 6, wherein a relationship between a distance L in a planar direction between continuous two marks which are recorded by said beam-waist of said light beam and a difference d of relative positions in a depth direction of said two marks satisfies $0<d/L<2.5$.

9. An information reproducing method for reproducing information which has been recorded into an optical recording medium, said information being reproduced by irradiating a light beam for reproducing through a lens, changing a position of a beam-waist of the light beam both in depth and planar directions of said optical recording medium, and detecting an intensity pattern of said light beam for reproducing which has passed through said optical recording medium, said method comprising:

reproducing information of at least two marks from a plurality of marks by detecting the intensity pattern of said light beam for reproducing, which has been passing through said optical recording medium, said at least two marks having different depths within a depth range of the optical recording medium such that said light beam for reproducing is capable of reproducing information of each of the at least two marks while maintaining a same distance between said lens and said optical recording medium;

reproducing information of a third mark of said plurality of marks, formed in said depth range so that said light beam for reproducing is capable of reproducing information of each of said at least two marks and said third mark while maintaining said same distance between said lens and said optical recording medium, and by detecting the intensity pattern of said light beam for reproducing after passing through the optical recording medium; and continuously reproducing information from said plurality of marks one after another by moving said beam-waist of said reproducing light beam in a three-dimensional direction to describe a continuous predetermined three-dimensional track or locus on which said plurality of marks are formed.

10. An information reproducing method for an optical recording medium as set forth in claim 9, wherein said optical recording medium comprises an optical disk having a disk-shape, and said information is reproduced by scanning said continuous predetermined three-dimensional track with said light beam in a radial direction of said optical disk while rotating said optical disk, and by adjusting said beam-waist of said light beam in a depth direction of said optical disk.

11. An information reproducing method for an optical recording medium as set forth in claim 10, wherein said continuous predetermined three-dimensional track is formed by fixing a position of said beam-waist of said light beam at a predetermined position in accordance with said radial direction while said optical disk is rotated, and moving said position of said beam-waist in the depth direction of said optical disk to read a first number of marks of said plurality of marks on a spiral three-dimensional track of which every mark has a same distance from a center of said optical disk, and to read a second number of marks of said plurality of marks on said spiral three-dimensional track by changing said position of said beam-waist of said light beam in said radial direction and then repeating moving said position of said beam-waist in the depth direction of said optical disk while said optical disk is rotated.

12. An information reproducing method for an optical recording medium as set forth in claim 10, wherein said continuous predetermined three-dimensional track is formed by scanning said beam-waist in both said radial direction and said depth direction while said optical disk is rotated to read said plurality of marks from a spiral three-dimensional track.

13. An information reproducing method for an optical recording medium as set forth in claim 10, wherein a relationship between a distance L in a planar direction between continuous two marks which are recorded by an irradiation of a recording light beam and a difference d of relative positions in said depth direction of said two marks satisfies $0<d/L<2.5$.

14. An information reproducing method for an optical recording medium as set forth in claim 9, wherein said optical recording medium comprises an optical rectangular-solid material having a rectangular-shape including a block-shape or a stick-shape, and said plurality of marks are read from said continuous predetermined three-dimensional track by changing a relative position between said optical rectangular-solid material and said beam-waist of said reproducing light beam in an arbitrary three-dimensional direction.

15. An information reproducing method for an optical recording medium as set forth in claim 14, wherein said optical rectangular-solid material has said block-shape or stick-shape, and said continuous predetermined three-dimensional track is described as a sine curve, by changing a relative position between said optical rectangular-solid material and said beam-waist of said light beam in a three-dimensional direction including a depth direction.

16. An information reproducing method for an optical recording medium as set forth in claim 14, wherein a relationship between a distance L in a planar direction between continuous two marks which are recorded by irradiation of a recording light beam and a difference d of relative positions in a depth direction of said two marks satisfies $0<d/L/2.5$.

17. An information recording apparatus for recording information into an optical recording medium, said information being reproduced by irradiating a light beam for reproducing through a lens, changing a position of a beam-waist of the light beam both in depth and planar directions of said optical recording medium, and detecting an intensity pattern of said light beam for reproducing which has passed through said optical recording medium, said apparatus comprising:

a light beam condensing part configured to form said beam-waist of said light beam by modulating a refractive index of the optical recording medium by irradiating said recording light beam passing through said optical recording medium; and a moving mechanism configured to move said beam-waist to describe a continuous predetermined three-dimensional track or locus, to form at least two marks of a plurality of marks to record information by said beam-waist, said at least two marks having different depths within a depth range of the optical recording medium such that said light beam for reproducing is capable of reproducing information of each of the at least two marks while maintaining a same distance between said lens and said optical recording medium, to form a third mark of said plurality of marks at a predetermined position near said at least two marks and within an allowable range of defocusing of said light beam for reproducing, and to continuously form new marks one after another.

18. An information recording apparatus for an optical recording medium as set forth in claim 17, wherein said optical recording medium comprises an optical disk having a disk-shape, and said information recording apparatus further comprises:

a rotating mechanism configured to rotate said optical disk;

a beam scanning mechanism configured to scan said light beam in a radial direction of said optical disk rotated by said rotating mechanism; and a focused position adjusting mechanism configured to adjust said beam-waist of said light beam in a depth direction of said optical disk.

19. An information recording apparatus for an optical recording medium as set forth in claim 18, wherein said continuous predetermined three-dimensional track is formed by fixing a position of said beam-waist of said light beam at a predetermined position in accordance with said radial direction while said optical disk is rotated, and moving said position of said beam-waist in the depth direction of said optical disk to form a first number of marks of said plurality of marks on a spiral three-dimensional track of which every mark has a same distance from a center of said optical disk; and to form a second number of marks of said plurality of marks on said spiral three-dimensional track by changing said position of said beam-waist of said light beam in said radial direction and then repeating moving said position of said beam-waist in the depth direction of said optical disk while said optical disk is rotated.

20. An information recording apparatus for an optical recording medium as set forth in claim 18, wherein said continuous predetermined three-dimensional track is formed by scanning said beam-waist in both said radial direction and said depth direction while said optical disk is rotated to form said plurality of marks on a spiral three-dimensional track.

21. An information recording apparatus for an optical recording medium as set forth in claim 19, wherein a relationship between a distance L in a planar direction between continuous two marks which are recorded by an irradiation of said light beam and a difference d of relative positions in said depth direction of said two marks satisfies $0<d/L<2.5$.

22. An information recording apparatus for an optical recording medium as set forth in claim 17, wherein said optical recording medium comprises an optical rectangular-solid material having a rectangular-shape including a block-shape or a stick-shape, and said information recording apparatus comprises:

said moving mechanism configured to move a relative position between said beam-waist and a focused position of said optical rectangular-solid material in an arbitrary three-dimensional direction; and an adjusting mechanism configured to adjust said beam-waist in a depth direction of said optical rectangular-solid material.

23. An information recording apparatus for an optical recording medium as set forth in claim 22, wherein said optical rectangular-solid material has said block-shape or stick-shape, and said continuous predetermined three-dimensional track is described as a sine curve, by changing a relative position between said optical rectangular-solid material and said beam-waist of said light beam in a three-dimensional direction including said depth direction.

24. An information recording apparatus for an optical recording medium as set forth in claim 22, wherein a relationship between a distance L in a planar direction between continuous two marks which are recorded by said beam-waist of said light beam and a difference d of relative positions in said depth direction of said two marks satisfies $0<d/L<2.5$.

25. An optical recording medium having information, said information being reproduced by irradiating a light beam for reproducing through a lens, changing a position of a beam-waist of the light beam both in depth and planar directions of said optical recording medium, and detecting an intensity pattern of said light beam for reproducing which has passed through said optical recording medium, wherein said optical recording medium stores the information such that one mark of a plurality of marks is formed at an arbitrary position, and following marks of said plurality of marks are formed at a predetermined position near the arbitrary position of said one mark and within an allowable range of defocusing of the light beam for reproducing by relatively moving said beam-waist of said recording light beam to describe a continuous predetermined three-dimensional track or locus, and said one and following marks having different depths within a depth range of the optical recording medium such that said light beam for reproducing is capable of reproducing information of each of the one and following marks while maintaining a same distance between said lens and said optical recording medium.

26. An optical recording medium as set forth in claim 25, wherein said optical recording medium comprises a disk-shaped optical disk, and allows said plurality of marks to be recorded to describe said continuous predetermined three-dimensional track by scanning said light beam in a radial direction of said optical disk while rotating said optical disk and by adjusting a position of said beam-waist of said light beam in a depth direction of said optical disk.

27. An optical recording medium as set forth in claim 26, wherein a relationship between a distance L in a planar direction between continuous two marks which are recorded by said beam-waist of said light beam and a difference d of relative positions in said depth direction of said two marks satisfies $0<d/L<2.5$.

28. An optical recording medium as set forth in claim 25, wherein said optical recording medium comprises an optical rectangular-solid material having a rectangular-shape including a block-shape or a stick-shape, and said plurality of marks are formed to describe said continuous predetermined three-dimensional track by changing a relative position between said optical rectangular-solid material and said beam-waist of said recording light beam in an arbitrary three-dimensional direction.

29. An optical recording medium as set forth in claim 28, wherein a relationship between a distance L in a planar direction between continuous two marks which are recorded by said beam-waist of said light beam and a difference d of relative positions in a depth direction of said two marks satisfies $0<d/L<2.5$.

* * * * *